(12) United States Patent
Floh et al.

(10) Patent No.: US 6,848,471 B2
(45) Date of Patent: Feb. 1, 2005

(54) IN-LINE CHECK VALVE

(75) Inventors: Roberto Floh, Thornhill (CA); Richard Spindler, Burlington (CA)

(73) Assignee: Hercules Valve Inc., Thornhill (CA)

( * ) Notice: Subject to any disclaimer, the term of this patent is extended or adjusted under 35 U.S.C. 154(b) by 62 days.

(21) Appl. No.: 10/237,039

(22) Filed: Sep. 9, 2002

(65) Prior Publication Data

US 2004/0045605 A1 Mar. 11, 2004

(51) Int. Cl.[7] .............................................. F16K 15/14
(52) U.S. Cl. ........................ 137/512.15; 137/516.15; 137/853; 137/859; 251/368
(58) Field of Search .................... 137/512.15, 516.11, 137/516.15, 852.853, 854, 859, 860; 251/368

(56) References Cited

U.S. PATENT DOCUMENTS

| | | | |
|---|---|---|---|
| 384,306 A | * | 6/1888 | Bourdil ..................... 239/518 |
| 1,800,066 A | * | 4/1931 | Glass ..................... 137/516.11 |
| 3,298,391 A | | 1/1967 | Savage |
| 3,384,113 A | * | 5/1968 | Pennisi ..................... 137/853 |
| 3,417,775 A | | 12/1968 | Smith |
| 3,459,217 A | * | 8/1969 | Callahan ................ 137/516.15 |
| 3,865,133 A | | 2/1975 | Alford |
| 4,171,007 A | * | 10/1979 | Bouteille ................ 137/601.19 |
| 4,290,454 A | | 9/1981 | Shelter |
| 4,582,081 A | | 4/1986 | Fillman |
| 4,811,758 A | | 3/1989 | Piper |
| 4,846,810 A | | 7/1989 | Gerber |
| 4,919,167 A | | 4/1990 | Manska |
| 5,020,611 A | | 6/1991 | Morgan et al. |
| 5,092,855 A | | 3/1992 | Pardes |
| 5,205,325 A | | 4/1993 | Piper |
| 5,507,436 A | | 4/1996 | Ruttenberg |
| 5,660,205 A | | 8/1997 | Epstein |
| 5,755,263 A | | 5/1998 | Jang |
| 5,971,024 A | * | 10/1999 | Penny ......................... 137/859 |
| 6,029,288 A | | 2/2000 | Ge et al. |
| 6,412,514 B1 | | 7/2002 | Raftis |

* cited by examiner

Primary Examiner—Ramesh Krishnamurthy
(74) Attorney, Agent, or Firm—Marks & Clerk

(57) ABSTRACT

A check valve is placed in a conduit for pressurized fluids, and comprises a cylindrical external housing having inlet and outlet ends, a cylindrical internal spigot, and an elastomeric sleeve fitted over the spigot. It is sealed at the second end, and has a plurality of radially directed vent apertures along its length. The elastomeric sleeve is securely fitted to the internal spigot, in the region of the first, inlet end. The elastomeric sleeve has an internal diameter and an elastic memory such that it fits and adheres snugly to the outer periphery of the spigot, and its elasticity is overcome at a positive gauge pressure of between 5 and 20 psi so that pressurized fluid will flow from the vent apertures. Backflow of fluid at substantially zero or negative gauge pressure is precluded.

13 Claims, 2 Drawing Sheets

IN-LINE CHECK VALVE

FIELD OF THE INVENTION

This invention relates to check valve assemblies, and in particularly to check valve assemblies that are intended to be placed in line in a fluid conduit within which a pressurized fluid is periodically delivered. Specifically, the check valve assembly of the present invention is intended for in-line applications where the pressurized fluid is one which ordinarily has corrosive or other deteriorating effects on parts such as springs and the like which are made of metal and which are ordinarily found in such check valves. To that end, check valve assemblies in keeping with the present invention employ an elastomeric sleeve as the valve member.

BACKGROUND OF THE INVENTION

There are many instances where check valve assemblies are employed in an in-line application, for precluding reverse flow of pressurized fluids moving through the conduit within which the check valve is installed. Typically, such installations are employed where a fluid—typically a liquid, but possibly a gas—is pumped from one location to a suitable receiving vessel such as a tank or other storage vessel.

When the fluid is being delivered, it is pressurized; and when delivery stops, pressurization of the fluid is also removed. However, typically it is undesirable, or in some cases forbidden, for there to be back flow of the fluid from the receiving vessel towards the source from whence it came. For that purpose, a check valve is typically installed in line within the conduit to which the pressurized fluid is delivered to the receiving vessel.

Moreover, in many such circumstances, the pressurized fluid is one which is dangerous to handle, or which may have corrosive or other deteriorating effects on ordinary check valve assemblies, particularly such assemblies that are typically used and which employ spring members to assure that they close when unpressurized. Examples of such fluids include, for purposes of illustration only, various acids such as hydrochloric, sulphuric, or nitric acid, gases such as ammonia or chlorine gas, and so on.

Typically, especially in industrial applications and the like, a positive gauge pressure occurs across a check valve, when the fluid on the inlet side thereof is pressurized, such that a gauge pressure between the inlet and outlet side may range only from a few psi up to, say, 20 psi. Moreover, after delivery of the pressurized fluid gases, the gauge pressure across a check valve may reduce to approximately zero or even become a negative value—that is, the pressure at the outlet side of the check valve may be higher than the pressure at the inlet side of the check valve.

It is known in many industrial applications to replace check valves annually, or sometimes many times during the year. That procedure is costly for a number of reasons: It requires the use of skilled personnel having plumbing and/or pipe fitting training, it may require visits to the field where the installation of the check valve is placed, and in any event it is costly because it requires maintenance of inventory and replacement of that inventory as check valves are withdrawn therefrom.

A principal object of the present invention is to provide check valve assemblies which effectively employ no moving parts, because of its employment of an elastomeric valve member which will change its shape and dimension. Moreover, check valve assemblies in keeping with the present invention are typically manufactured from materials which are impervious or at least resistant to corrosion or deterioration in the presence of the pressurized fluid with which they are to work.

DESCRIPTION OF THE PRIOR ART

Several prior art patents exist, which are known to the inventors herein, and which employ valve closure members which are made from flexible materials such as elastomers and the like.

One such patent is Fortune U.S. Pat. No. 3,807,444, issued Apr. 30, 1974. Here, a multi-ported check valve employs valve closure members which are, indeed, made of flexible materials such as elastomers. Two parts having abutting flanges are locked together, and a portion of the closure member is free to flex open or closed when pressure is exerted from the upstream side, or back pressure is exerted from the downstream side of the closure members, respectively.

Another pressurized check valve assembly is taught in Piper U.S. Pat. No. 4,811,758 issued Mar. 14, 1989. This check valve is incorporated into a drill string which is powered by a rotary table of a drilling rig, and its purpose is to prevent drainage of fluid from the stand pipe and rotary hose when the flow of fluid through the drill string is interrupted such as when another section of the drill pipe is being added to the drill string. The valve assembly permits an annular pressure valve cavity which is formed between the internal wall of the valve chamber and an elastomeric sleeve of a flow restricting assembly, to be pressurized with gas. Thus, the elastomeric sleeve is compressed to close the valve chamber until such time as the pressure of the fluid flowing through the drill string is sufficient to compress the gas in the annular pressure cavity and to permit the elastomeric sleeve to be moved to a noncompressed condition, so that the valve chamber is again in an open mode.

Another check valve sub-assembly which is for use in a dual pipe string is taught by Morgan et al in U.S. Pat. No. 5,020,611, issued Jun. 4, 1991. This check valve assembly includes an inner tube and an outer annular member, and is such that fluid flow through the inner pipe is conducted through the inner tube and is maintained separate from an annular passage way. The check valve has an elastomeric sealing member which is in the form of a frustum of a cone, with an axial passageway formed therethrough to sealingly engage the outer circumferential wall surface of the inner tube. Thus, fluid flow through the annular passageway in one direction forces the small diameter end of the elastomer into sealed engagement respective to the inner tubing, whereas fluid flow in the opposite direction forces the elastomer away from the inner tube so as to permit the flow of fluid therebetween.

Still another patent relating to rotatable drill strings having flow control valve assemblies therein, is Piper U.S. Pat. No. 5,205,325, issued Apr. 27, 1993. Here, a flow control valve assembly comprises a tubular body member having a fluid flow passage extending through, together with a flow control valve which is supported within the fluid flow passage. The flow control valve is, not unlike the other Piper patent referred to above, a self-contained pressurized unit and is provided with an annular pressure cavity so that the valve can be selectively opened and closed in response to a pressure differential between an annular pressure cavity and the pressure of the fluid in the fluid flow passage of the tubular body member.

A different assembly is taught in Ge et. al. U.S. Pat. No. 6,029,288, issued Feb. 29, 2000. This patent relates to a pressure flushing system for use in a toilet tank, and has a check valve which is located in a passage between an air inlet and a chamber. The check valve is located in the passage, and opens in response to a venturi effect caused by water flow through the chamber so as to draw air into the chamber to mix with the water flowing through the chamber. The check valve has an elastomeric sleeve which is positioned within the passage, with normally closed flexible lips extending toward the chamber which open to permit passage of air into the chamber to mix with the water when there is a pressure in the chamber which is less than atmospheric pressure—in other words, during the time when a toilet is flushed.

U.S. Pat. No. 4,290,454 issued to SHETLER on Sep. 22, 1981 teaches a back flow valve comprising a housing having an inlet and an outlet and a tube mounted in the housing which has an open end communicating with the inlet of the housing. The tube has the other end closed and has a plurality of spaced openings at the centre. An elastic sleeve is telescoped over the tube and closes the opening. When water flows from the inlet through the openings, the sleeve is forced to stretch so that the water can flow between the tube and the sleeve towards the ends of the sleeve. As the water flows, the sleeve rotates. This permits a self-cleaning action in the event that foreign matter tends to become trapped between the sleeve and the tube.

U.S. Pat. No. 4,919,167 issued to MANSKA on Apr. 24, 1990 teaches a medical check valve which has a predetermined cracking pressure while ensuring fluid flow through the valve in only one direction. The check valve includes a valving means comprised of a valve member and a seat member disposed within a cylindrical channel. The valve member is coaxially aligned within the channel downstream of the seat member and provides a valve cavity into which a portion of the seat member is disposed. The interface between the valve member and the seat member creates a seal length. The valve member is radially stressed by the axial position of the seat member so that the sealing force along the seal length is substantially radial. Fluid flow passes through an axial bore in the valve seat member and upon sufficient pressure unseats the seal length and passes through the annular passageway between the valve member and the seat member.

U.S. Pat. No. 4,846,810 issued on Jul. 11, 1989 to GERBER teaches a valve assembly for use in discharging a fluid from a container, and for preventing any flow of contaminants through the valve assembly into the container. The valve assembly includes an elongated valve body, an elastomeric sheath laterally enclosing the outside surface of the valve body. An inlet channel extends in the elongated direction from one end of the valve body for receiving a fluid from a container, and an outlet channel is located at the opposite end of the valve body extending in the elongated direction for discharging the fluid received in the inlet channel. At least one port extends outwardly from the inlet channel to the outside surface of the valve body so that the fluid can flow between the outside surface and the elastomeric sheath causing the sheath to expand. The fluid between the outside surface of the valve body and the sheath flows to at least one other port in the valve body directed inwardly to the outlet channel so that the fluid can be discharged.

U.S. Pat. No. 5,092,855 issued to PARDES on Mar. 3, 1992 teaches an enclosing sleeve for a one-way valve. Here, PARDES teaches a sleeve enclosing a one-way valve for limiting expansion of the flexible membrane or sheath on the valve body, and at the same time, assisting in sealing the membrane to the valve body, and protecting the valve. The valve structure as taught by PARDES is similar to that described in the GERBER patent. PARDES discloses the manner in which the tubular member or sleeve is supported relative to the one-way valve or to a container in which the valve is secured.

U.S. Pat. No. 5,660,205 issued to EPSTEIN on Aug. 26, 1997 teaches a one-way valve for use with a medical device for supplying a fluid under pressure to a channel and for blocking a backflow of fluid from the channel to a catheter. The one-way valve assembly includes a first tube for communicating the fluid into a channel, a valve, and a second tube communicating with the container supplying the fluid and transmitting the fluid to the first tube via the valve. The valve comprises a base member with a hollow interior and a sealed distal end. The hollow interior is capable to communicate the fluid between the second tube and the first tube through at least one slit aperture which is positioned near the sealed distal end of the base member. In order to prevent backflow of fluid from the first tube into the base, the base member is covered by a flexible pressure-responsive surface. The flexible pressure-responsive surface also unseals the slit aperture to permit forward flow of the fluid.

Finally, Raftis U.S. Pat. No. 6,412,514, issued Jul. 2, 2002, teaches another check valve assembly for placement in a fluid conduit where a separator element has at least one opening, and is placed crosswise between an inlet pipe and an outlet pipe. On the downstream side of the separator element there is placed a pliant sealing member, which covers a opening or openings in the separator element. During forward flow, from upstream to downstream, the pliant sealing member will be deformed and allow fluid to pass around it. However, during reverse fluid flow from downstream to upstream, the pliant sealing member flattens and covers the openings in the separator element, thereby preventing reverse fluid flow through the opening from the outlet pipe to the inlet pipe.

SUMMARY OF THE INVENTION

As noted above, the purpose of the present invention is particularly to provide a check valve assembly for in-line placement in a conduit within which a pressurized fluid is periodically delivered from a pump to a receiving vessel. When the pressurized fluid is not being delivered, the gauge pressure across the check valve will reduce from a positive value to approximately zero or a negative value.

The check valve assembly comprises a cylindrical external housing having an inlet end and an outlet end, a cylindrical internal spigot, and an elastomeric sleeve fitted over the internal spigot.

The external housing is adapted to the fitted to a fluid conduit at its outlet end for delivery of a pressurized fluid therefrom to a receiving vessel.

The cylindrical internal spigot is sealed at a first, inlet end thereof, to the external housing at its inlet end, and it is adapted to be fitted to a fluid conduit for delivery of pressurized fluid thereto from a pump.

Also, the cylindrical internal spigot extends axially along the interior of the cylindrical external housing from the inlet end thereof, towards the outlet end thereof.

Further, the cylindrical internal spigot has a radially outwardly directed sloping shoulder which is formed at a second end thereof near the outlet end of the external housing. The slope of the shoulder is directed away from the second end towards the first end of the cylindrical internal spigot.

Still further, the cylindrical internal spigot is sealed at its second end. It has a plurality of radially directed vent apertures formed therein from the interior of the internal spigot to the outer periphery thereof, and that plurality of radially directed vent apertures is arranged partially along the length of the cylindrical internal spigot.

The elastomeric sleeve is securely fitted to the internal spigot, in the region of the first, inlet end thereof. The elastomeric sleeve also has an internal diameter and an elastic memory such that it fits snugly to the outer periphery of the internal spigot at least in the region thereof where the radially directed vents are located, and over the sloped shoulder.

Moreover, the elasticity of the elastomeric sleeve is such that it is overcome at a positive gauge pressure between the inlet and outlet ends of the external housing of the check valve assembly, when the positive gauge pressure is in the range of between 5 to 20 psi.

Thus, pressurized fluid will flow from the radially directed vent apertures past the periphery of the internal spigot and between the periphery and the internal surface of the elastomeric sleeve towards the outlet end of the external housing when the elasticity of the elastomeric sleeve is overcome. Moreover, backflow of fluids at substantially zero or negative gauge pressure between the inlet and outlet ends of the external housing is precluded, due to the elastic memory of the elastomeric sleeve as it adheres to the outer periphery of the internal spigot.

In one embodiment, the cylindrical internal spigot has a radially outwardly directed annular ridge which is formed on the outer periphery thereof at a position near the first, inlet end thereof. The elastomeric sleeve is fitted over the annular ridge and against the outer periphery of the internal spigot, and it extends beyond the sloped shoulder of the internal spigot at the second end thereof.

In another embodiment, the elastomeric sleeve is securely fitted to the cylindrical internal spigot, in the region of the first, inlet end thereof by securing means chosen from the group consisting of O-rings, and gaskets.

Typically, the pressurized fluid may be a caustic or corrosive liquid, an acid, or a gas.

Because the pressurized fluid is generally one which may have corrosive or otherwise deteriorating effects on the materials which are used in ordinary check valve assemblies which employ springs and the like, the material of the cylindrical external housing and of the cylindrical spigot is typically chosen from a suitable plastics material, brass, stainless steel, other steels, copper, aluminum, and combinations thereof.

Also, the material of the elastomeric sleeve may be chosen from the group which consists of C-FLEX®, Buna-N, VITON™, EPDM, silicone, nylon, rubber, flexible PVC, and combinations thereof.

Typically, the cylindrical external housing is threaded internally at its outlet end for fitment to a fluid conduit which leads towards a receiving vessel for the pressurized fluid.

Also, similarly the cylindrical internal spigot is threaded internally at its inlet end for fitment to a fluid conduit which leads from a pump for the pressurized fluid.

In general, the length of the internal spigot as it extends along the interior length of the external housing is approximately 60% to 90% of the interior length of the external housing.

Typically, the diameter of the annular ridge plus twice the thickness of the material of the elastomeric sleeve is substantially equal to the interior diameter of the cylindrical outer housing.

The angle of the slope of the sloping shoulder with respect to the longitudinal axis of the check valve assembly is in the range of 30° to 60°.

Also, the region of the internal spigot where the radially directed vent apertures are located is typically from 30% to 60% of the length of the internal spigot.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Figure 1:
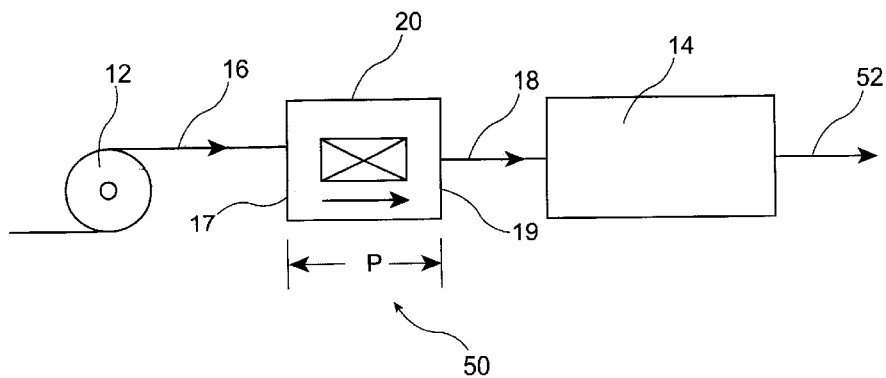
FIG. 1 is a simplified schematic showing the installation of an in-line check valve in a typical environment therefor.
Figure 2:
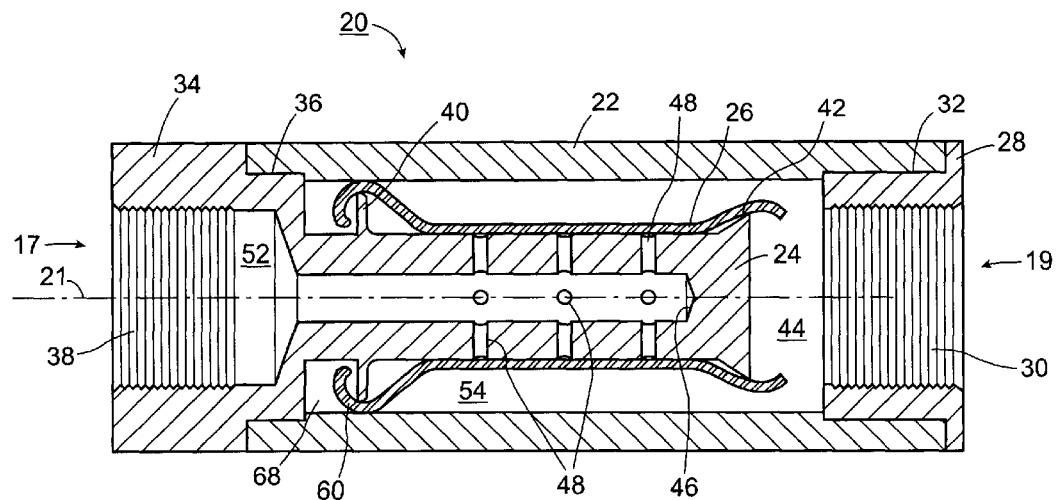
FIG. 2 is a cross sectional view of a check valve in keeping with the present invention, in a closed condition.
Figure 3:
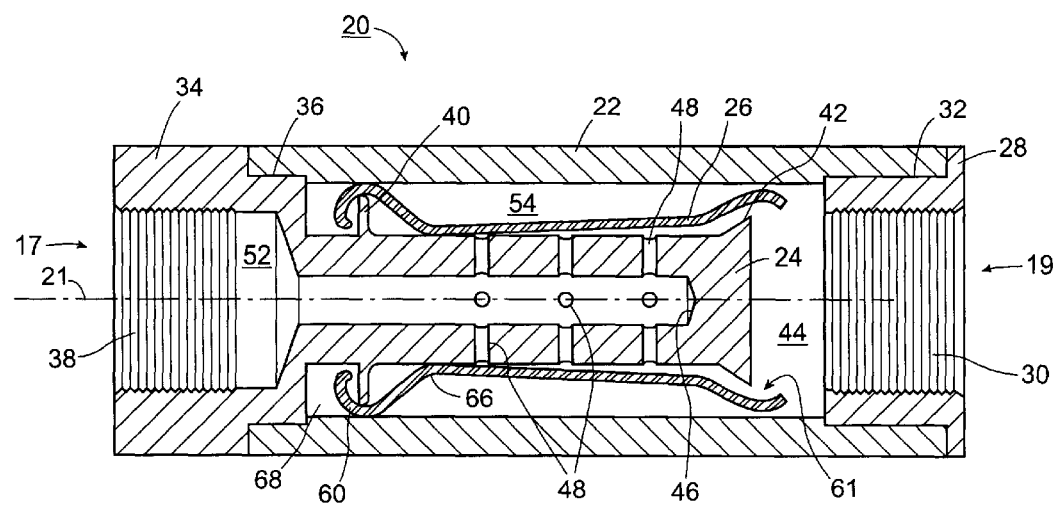
FIG. 3 is a view similar to FIG. 2 where the check valve is in an open condition.

A typical check valve assembly 20 in keeping with the present invention, is shown in FIGS. 2 and 3, and may be installed in a typical industrial installation employing check valve assemblies, as shown in FIG. 1.

Turning to FIG. 1, a pump 12 is shown to provide a source of pressurized fluid which will flow through the in-line installed check valve 20 towards a receiving vessel 14. As noted, the receiving vessel is typically a tank or other storage vessel, depending on whether the pressurized fluid to be delivered to it is a liquid or a gas.

The pressurized fluid is delivered from the pump 12 through a conduit 16, to the inlet end 17 of the check valve 20; and the conduit 18 leads from the outlet end 19 of the check valve 20 towards the receiving vessel 14.

As seen at 50, a gauge pressure identified as ΔP maybe measured across the check valve assembly 20 from its inlet end 17 to the outlet end 19. During delivery of pressurized fluid through the check valve assembly 20, the gauge pressure ΔP is positive. When the pressurized fluid is not being delivered through the check valve assembly 20, ΔP may be substantially zero or it may, indeed, be negative if the receiving vessel 14 is pressurized above atmospheric pressure or, in any event, above the pressure at the inlet end 17 of the check valve assembly 20.

Depending on the nature of the pressurized fluid, it will be lead away from the receiving vessel 14 through conduit 52, for whatever purpose it is intended.

Referring now to FIGS. 2 and 3, in particular, the structure of the check valve assembly in keeping with the present invention is shown. First, a cylindrical outer housing 22 is shown, together with a cylindrical internal spigot 24 and an elastomeric sleeve 26 which is fitted over the internal spigot 24.

Typical structure of the check valve assembly, although not necessarily required, includes an internally threaded end cap 28, having internal threads 30, and being sealed or bonded to the internal surface of the cylindrical external housing 22 at the outlet end 19, as shown at 32. Depending on the material from which the check valve assembly is made, that bonding may be using suitable adhesives or cements, swaging, welding, or the like.

Similarly, the cylindrical internal spigot 24 is typically formed together with an end cap 34 which is secured to the internal surface of the cylindrical external housing 22 as shown at 36. Internal threads 38 are provided at the inlet end 17 of the internal spigot 24, being the inlet end 17 of the check valve assembly 20.

It is thereby seen that the external housing 22 is adapted to be fitted at 30 to a fluid conduit 18, at the outlet end 19, for delivery of a pressurized fluid from the check valve assembly 20 to the receiving vessel 14.

Likewise, the cylindrical internal spigot 24 is sealed at its first inlet end 34, 36 to the external housing 22 at the inlet end 17, and is adapted at 38 to be fitted to a fluid conduit 16 for delivery of a pressurized fluid thereto from the pump 12.

Of course, it will be seen in each of FIGS. 2 and 3 that the cylindrical internal spigot 24 extends axially along the interior of the cylindrical external housing 22, from the inlet end 17 towards the outlet end 19.

The elastomeric sleeve 26 is securely fitted to the internal spigot 24, in the region of the first, inlet end 17 thereof.

In one embodiment, a radially outwardly directed annular ridge 40 is formed on the outer periphery of the cylindrical and internal spigot 24. Its position is near the first, inlet end 17 of the check valve assembly 20, as can be seen in FIGS. 2 and 3.

At the other end of the cylindrical internal spigot 24, there is a radially outwardly directed sloping shoulder 42. It is seen that the second end of the internal spigot 24 is near, but not at, the outlet end 19 of the check valve assembly 20, leaving an outlet chamber 44 in that region.

It is also seen in FIGS. 2 and 3 that the slope of the sloping shoulder 42 is directed away from the second end of the spigot 24 towards its first end.

It will also be seen in FIGS. 2 and 3 that the internal spigot 24 is sealed at its second end as shown at 46. However, there are a plurality of radially directed vent apertures 48 which are formed in the cylindrical internal spigot 24, and which extend from the interior 52 of the internal spigot 24 towards the outer periphery thereof.

It will be understood that a chamber 44 is formed within the check valve assembly 20, between the internal spigot 24 and the interior surface of the external housing 22.

In one embodiment, it will be seen that the elastomeric sleeve 26 is fitted on the annular ridge 40, as shown at 60, so that it extends beyond the annular ridge 40 towards the inlet end 17. Due to its own elasticity, the elastomeric sleeve 26 curls over the annular ridge 40, as can be seen in FIGS. 2 and 3.

Moreover, the elastomeric sleeve 26 is fitted onto the internal spigot 24, and it also extends beyond the sloped shoulder 42 at the outlet end 19 of the check valve assembly 20 into the chamber 44, as can also be seen in FIGS. 2 and 3.

It will be understood that the elastomeric sleeve 26 may also be securely fitted to the cylindrical internal spigot 24, in the region of the first, inlet end 17 by securing means chosen from the group consisting of O-rings, and gaskets.

The elastomeric sleeve has an internal diameter and an elastic memory which are both such that the elastomeric sleeve 26 fits over and adheres snugly to the outer periphery of the internal spigot 24 at least in the region thereof where the radially directed vent apertures 48 are located. It will also be seen, of course, that the elastomeric sleeve 26 fits and adheres snugly to the sloped shoulder 42.

Of course, the above description, as it applies to FIG. 2 will be understood to be effective only when the ΔP between the inlet end 17 and the outlet end 19 is zero, a negative value or below a value which is such that the elasticity of the elastomeric sleeve is overcome so as to assume a position or configuration such as that shown in FIG. 3.

In FIG. 3, it is seen that the elastomeric sleeve 26 has expanded away from the periphery of the internal spigot 24 at least in the region where the vent apertures 48 are located, and away from the sloped shoulder 42. Thus, there is formed a flow path 61 which is such that pressurized fluid will flow from the radially directed vent apertures 48 past the periphery of the internal spigot 24, and between the periphery and the internal surface of the elastomeric sleeve 26 towards the outlet end 19. This condition will occur when the elasticity of the elastomeric sleeve 26 is overcome at a positive gauge pressure between the inlet end 17 and the outlet end 19 of the check valve assembly. Typically, the material of the elastomeric sleeve 26 is such that the condition shown in FIG. 3 will occur when the positive gauge pressure, ΔP, is in the range of from 5 psi up to as much as 20 psi. Above that ΔP gauge pressure, the elastmeric sleeve 26 will maintain its configuration as shown in FIG. 3, until such time as the ΔP gauge pressure reduces to the relief pressure noted above, at which time the elasticity and elastic memory of the elastomeric sleeve 26 will again come into play and cause the elastomeric sleeve 26 to assume the configuration which is shown in FIG. 2.

Thereafter, it can be seen that a ΔP which is below the relief pressure noted above, or in the region of zero or even negative from the inlet end 17 to the outlet end 19, will assure continuance of the position of the elastomeric sleeve 26 in the configuration shown in FIG. 2.

It has been observed that, even in flow conditions, there may be no additional hoop stress formed in the elastomeric sleeve 26 in the region shown generally at 66. Thus, there is permanent hoop stress in the elastomeric sleeve 26 in the region where it overlies the annular ridge 40, and there is a varying hoop stress that occurs in the elastomeric sleeve 26 when it assumes the configuration of FIG. 3, but at rest as shown in FIG. 2 there is only a hoop stress which comes as a consequence of its own elasticity and the elastic memory of the material of the elastomeric sleeve 26.

As noted, typically the pressurized fluid with which check valve assemblies in keeping with the present invention are intended to work, may be a caustic or corrosive materials, acids, gases, and the like, all of which might cause corrosion or deterioration to ordinary steels springs and the like and all of which may be extremely harmful to human beings if a check valve were to inadvertently open as a consequence of deterioration or corrosion of the elements thereof.

Accordingly, typically the material from which the structural elements of check valve assemblies of the present invention are assembled will include suitable plastics material such as PVC or the like, having sufficient structural rigidity as to be molded or machined, and to withstand the pressures to which it may be subjected. Other materials may include brass, stainless steel or other steels, copper, or aluminum, or combinations thereof, depending on the nature of the pressurized fluid which will pass through the check valve assembly when in use.

Typical materials from which the elastomeric sleeve is manufactured are particularly an elastomer identified by its trademark C-FLEX®. Other elastomeric materials include rubbers and rubberized, and rubber-like materials such as Buna-N, VITON™, EPDM, silicone, nylon, rubber, flexible PVC, and combinations thereof.

It is typical that the length of the internal spigot 24, within the interior of the external housing 22 is such as to be in the range of 60% to 90% of the internal length of the external housing 22.

Likewise, it is typical that the region of the internal spigot 24 where the radially directed vent apertures 48 are located, is from 30% to 60% of the length of the internal spigot.

Typically, the angle of the slope of the sloping shoulder 42, with respect to the longitudinal axis 21, is in the range of 30° to 60°.

A chamber 68 is formed behind the annular ridge 40, at the inlet end of the internal spigot 24. That chamber 68 may or may not assume the same pressure as the chamber 44, depending on the manner in which the elastomeric sleeve 26 is fitted to the interior of the external housing 22 in the region of the annular ridge 40. Thus, the diameter of the annular ridge 40 plus twice the thickness of the material of the elastomeric sleeve 26 may be substantially equal to the interior diameter of the cylindrical outer housing 22, whereby the chamber 68 is effectively isolated from the chamber 44.

Figure 4:
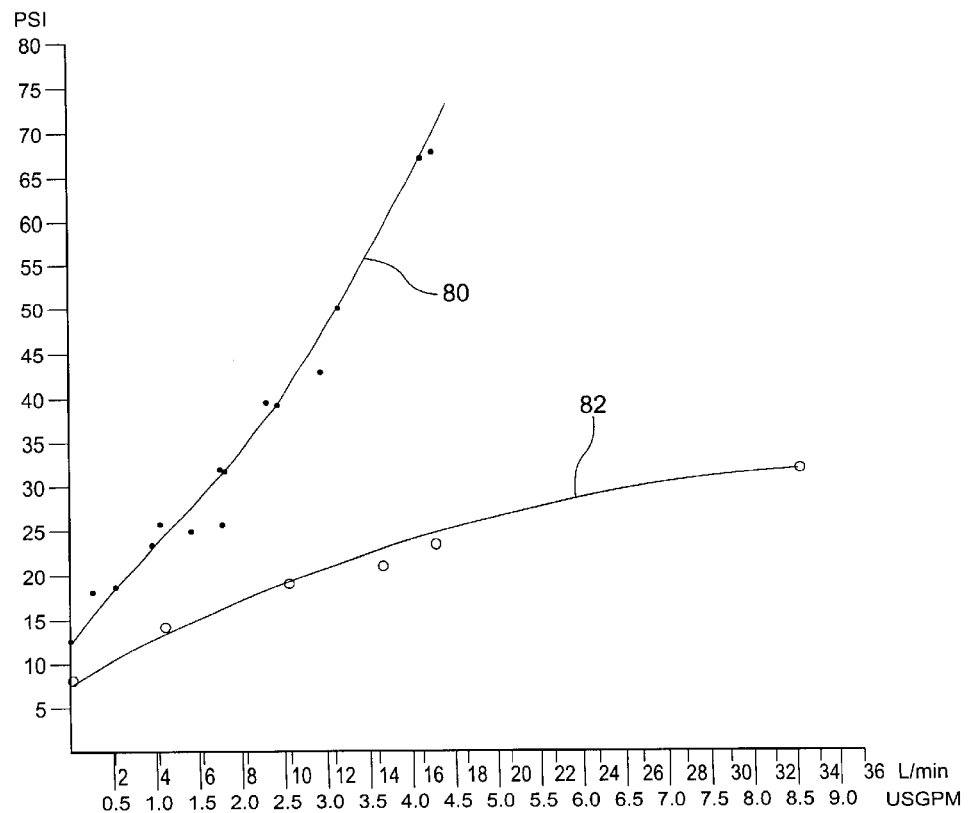
FIG. 4 shows a pair of typical curves for different sized check valves, comparing the gauge pressure drop across the check valve to liquid flow through the check valve.

Referring now to FIG. 4, two curves 80 and 82 are shown, being curves which illustrate pressure differential across a check valve assembly in keeping with the present invention. Pressure ΔP is shown on the vertical axis and liquid flow is shown on the horizontal axis. The curves relate to two different sized check valve assemblies. Curve 80 is for a check valve assembly having a nominal 0.25 inch size—meaning that each of the conduits 16 and 18 to which it is fitted has an internal diameter of 0.25 inches. Curve 82 relates to a similar check valve having a nominal size of 0.50 inches.

It will be seen that the flexible elastomeric sleeve 26 opens in the smaller check valve at a gauge pressure across the check valve of approximately 12 psi; and that of a gauge pressure ΔP of approximately 75 psi, flow through the check valve assembly reached nearly 16 liters per minute.

Likewise, the valve which gave rise to curve 82 opened at approximately 7.5 psi, and at a gauge pressure ΔP across the valve of approximately 30 psi, liquid flow of about 33 liters per minute was attained.

It will be understood, of course, that different materials than those which have been described above, for purposes of example only, and different configurations of check valve assemblies other than those illustrated in FIGS. 2 and 3, can be employed without departing with the spirit and scope of the attended claims.

Use of the words "substantially" and "approximately" are intended to indicate that absolute values of zero pressure, or absolute dimensions with very specific values, are neither meant nor necessary. It will be understood by those skilled in the art, particularly the art relating to mechanical fixtures and assemblies such as check valve assemblies in keeping with the present invention, that pressures, mechanical characteristics, and dimensions, may vary from sample to sample and from time to time. On the other hand, it will be understood that check valve assemblies in keeping with the present invention function in the intended and desired manner as a consequence of the assurance that back flow is precluded as a consequence of the action of the elasticity and the elastic memory of the elastomeric sleeve.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A check valve assembly for placement in a fluid conduit within which a pressurized fluid is periodically delivered from a pump to a receiving vessel, and wherein when pressurized fluid is not being delivered the gauge pressure across said check valve will reduce from a positive value to approximately zero or a negative value; said check valve assembly comprising:

a cylindrical external housing having an inlet end and an outlet end;

a cylindrical internal spigot; and an elastomeric sleeve fitted over said internal spigot;

wherein said external housing is adapted to be fitted to a fluid conduit at said outlet end for delivery of a pressurized fluid therefrom to a receiving vessel;

wherein said cylindrical internal spigot is sealed at a first, inlet end thereof to said external housing at said inlet end thereof, and is adapted to be fitted to a fluid conduit for delivery of pressurized fluid thereto from a pump;

wherein said cylindrical internal spigot extends axially along the interior of said cylindrical external housing from said inlet end thereof towards said outlet end thereof;

wherein said cylindrical internal spigot has a radially outwardly directed sloping shoulder formed at a second end thereof near said outlet end, of said external housing, wherein the slope of said shoulder is directed away from said second end towards said first end;

wherein said cylindrical internal spigot is sealed at said second end, and has a plurality of radially directed vent apertures formed therein from the interior to the outer periphery thereof, and arranged partially along the length thereof;

wherein said elastomeric sleeve is securely fitted to said internal spigot, in the region of said first, inlet end thereof, wherein said elastomeric sleeve has an internal diameter and an elastic memory such that it fits and adheres snugly to the outer periphery of said internal spigot at least in the region thereof where said radially directed vent apertures are located, and over said sloped shoulder; and wherein the elasticity of said elastomeric sleeve is such that it is overcome at a positive gauge pressure between the inlet and outlet ends of said external housing in the range of between 5 and 20 psi;

whereby pressurized fluid will flow from said radially directed vent apertures past the periphery of said internal spigot and between the periphery and the internal surface of said elastomeric sleeve towards the outlet end of said external housing when the elasticity of said elastomeric sleeve is overcome, and backflow of fluid at substantially zero or negative gauge pressure between said inlet and outlet ends of said external housing is precluded due to the elastic memory of said elastomeric sleeve as it adheres to the outlet periphery of said internal spigot.

2. The check valve assembly of claim 1, wherein said cylindrical internal spigot has a radially outwardly directed annular ridge formed on the outer periphery thereof at a position near the first, inlet end thereof, and wherein said elastomeric sleeve is fitted over said annular ridge and against the outer periphery of said internal spigot.

3. The check valve assembly of claim 1, wherein said elastomeric sleeve is securely fitted to said cylindrical internal spigot, in the region of said first, inlet end thereof by securing means chosen from the group consisting of O-rings, and gaskets.

4. The check valve assembly of claim 1, wherein said pressurized fluid is a caustic or corrosive liquid, an acid, or a gas.

5. The check valve assembly of claim 1, wherein the material of said cylindrical external housing is chosen from the group consisting of plastics, brass, stainless steel, steel, copper, aluminum, and combinations thereof.

6. The check valve of claim 1, wherein the material of said cylindrical internal spigot is chosen from the group consisting of plastics, brass, stainless steel, steel, copper, aluminum, and combinations thereof.

7. The check valve assembly of claim 1, wherein the material of said elastomeric sleeve is chosen from the group consisting of C-FLEX®, Buna-N, VITON™, EPDM, silicone, nylon, rubber, flexible PVC, and combinations thereof.

8. The check valve assembly of claim 1, wherein said cylindrical external housing is threaded internally at the outlet end thereof for fitment to a fluid conduit leading towards a receiving vessel for said pressurized fluid.

9. The check valve assembly of claim 1, wherein said cylindrical internal spigot is threaded internally at the inlet end thereof for fitment to a fluid conduit leading from a pump for said pressurized fluid.

10. The check valve assembly of claim 1, wherein said internal spigot extends along the interior length of said external housing for a length in the range of 60% to 90% thereof.

11. The check valve assembly of claim 1, wherein the diameter of said annular ridge plus twice the thickness of the material of said elastomeric sleeve is substantially equal to the interior diameter of said cylindrical outer housing.

12. The check valve assembly of claim 1, wherein the angle of the slope of said sloping shoulder with respect to the longitudinal axis of said check valve assembly is in the range of from 30° to 60°.

13. The check valve assembly of claim 1, wherein the region of said internal spigot where said radially directed vent apertures are located is from 30% to 60% of the length of said internal spigot.

* * * * *